Nov. 14, 1939.  N. SASSANO  2,179,563
ADJUSTABLE MARGIN FLOAT
Filed May 26, 1939  2 Sheets-Sheet 2
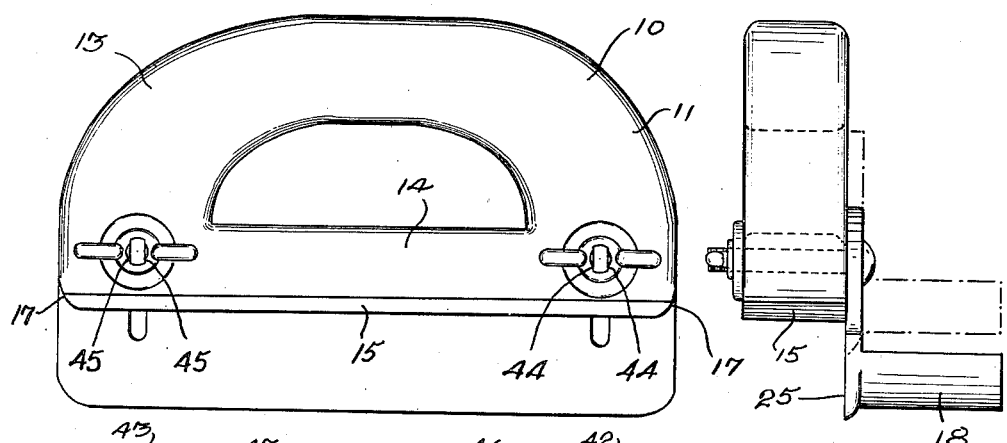
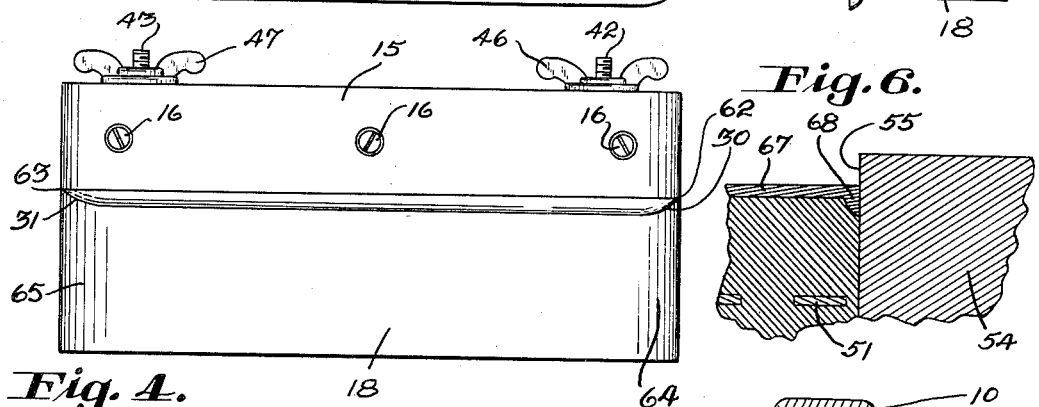
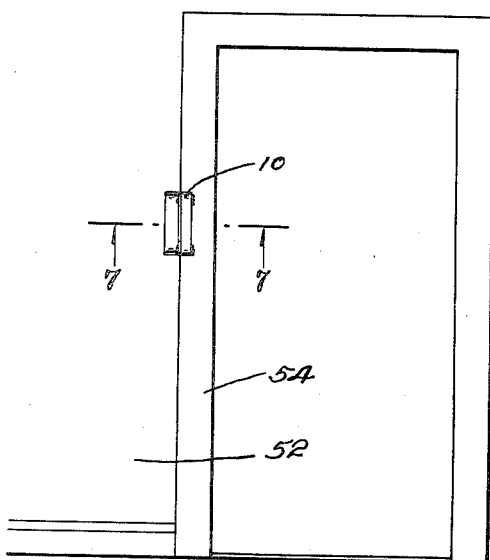
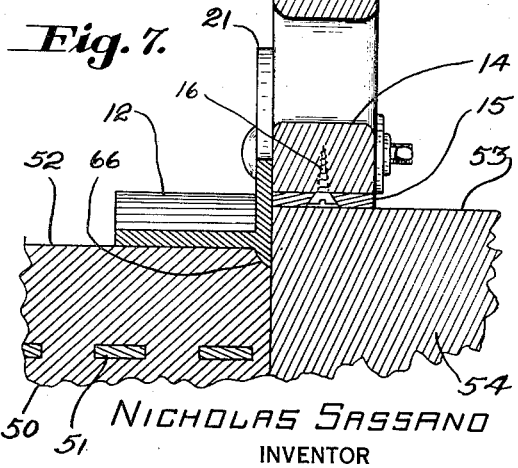
Nicholas Sassano
INVENTOR
BY Richard S. Temko
ATTORNEY Patented Nov. 14, 1939

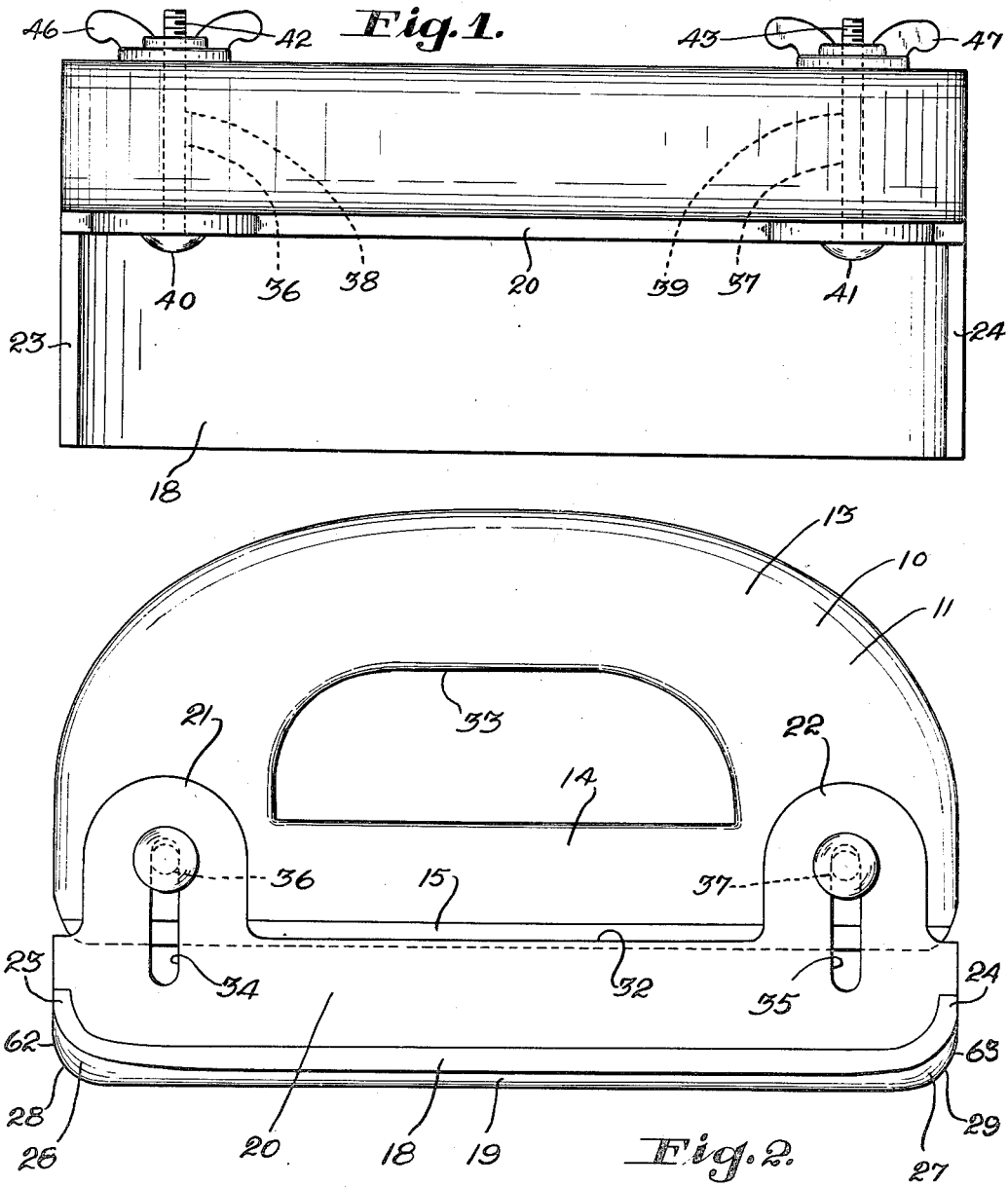

2,179,563

UNITED STATES PATENT OFFICE 2,179,563

ADJUSTABLE MARGIN FLOAT

Nicholas Sassano, Mount Vernon, N. Y.

Application May 26, 1939, Serial No. 275,875

2 Claims. (Cl. 72—136)

This invention relates generally to tools for placing and smoothing plastic materials and more particularly to an adjustable margin float for plaster work.

Among the objects of the present invention is the provision of a novel float structure which is readily adjustable so that the level of plaster coats may be properly regulated with relation to adjacent building parts such as doors, windows, moldings and the like.

Another object herein lies in the provision of a margin float tool which enables the plasterer to put in place the rough or neat coat in a quicker and easier manner.

A feature of the present invention lies in the fact that the present novel tool is very easily handled in a comfortable manner so that the same does not tire the operator's hand when in use.

Another object herein lies in the provision of structure wherein the adjustable parts are protected from the plastic rough plaster so that the adjustment thereof is not interfered with.

A still further object herein lies in the provision of an adjustable float structure whereby in using the tool, a groove or furrow is formed at the edge of the rough or neat coat, and simultaneously with the forming of said groove, the adjacent building parts are cleared of undesirable plaster.

Another object herein lies in the provision of groove forming and edge smoothing structure which is adjustable as a unit with relation to the handle guide shoe so that adjustments may be quickly made, and the depth of the groove may be of a predetermined amount regardless of the adjustments which may be made to accommodate building parts, such as door frames, window frames, and moldings which project from the wall surface in varying amounts.

Another object herein lies in the provision of a tool having the above described characteristics yet which is simple in construction, substantially fool-proof, has a relatively small number of parts and is so constructed as to be not deleteriously affected by the plastic materials with which it is intended for use.

These objects and other incidental ends and advantages will more fully appear in the progress of this disclosure and be pointed out in the appended claims.

In the drawings in which similar reference characters designate corresponding parts throughout the several views:

Figure 1 is a top plan view showing an embodiment of the invention.

Figure 2 is a side elevational view of Figure 1 as seen from the lower portion of Figure 1. In Figure 2, the adjustable float plate is shown in its lowermost position.

Figure 3 is a side elevational view, slightly reduced, as seen from the upper portion of Figure 1.

Figure 4 is a bottom plan view.

Figure 5 is an end elevational view as seen from the right hand side of Figure 3.

Figure 6 is a sectional view taken similarly to Figure 7 and showing the rough and finish plaster coats in place as effected by the present invention.

Figure 7 is an enlarged fragmentary sectional view as seen from the plane 7—7 on Figure 8.

Figure 8 is a schematic view showing the embodiment of Figure 1 in operation in conjunction with the door frame. The operator's hand is not shown for purposes of clarity.

The adjustable margin float generally indicated by numeral 10 is composed generally of a handle element 11 and an adjustable float plate 12. The handle is preferably substantially D-shaped, the curved portion 13 thereof being shaped to form a comfortable grip for the operator while the base 14 thereof is substantially rectilinear in general configuration and the lower surface thereof is provided with a sole plate 15. The handle element 11 is preferably composed of wood or other light easily worked material, or the same may be molded of plastics such as phenolic compounds, urea compounds, etc. The sole plate 15 is secured to the base 14 in any suitable manner, as for example, by means of the screws 16 which engage the lower portion of the base 14. The ends of the sole plate 15 as well as the handle base 14 adjacent thereto are rounded as indicated at 17 so that when the handle 11 is slid along a surface which is being used as a guide for the formation of a plaster coat in the proper position with relation to said surface, the sole plate and adjacent portions of the handle element 11 may ride over, and not catch upon small obstructions due to imperfections in said surface. The sole plate 15 is preferably composed of aluminum or other light not easily corroded material, and the screws 16 are preferably of brass or stainless steel. The sole plate 15 acts as a guide shoe, and being substantially symmetrical in configuration, the handle element 11 may be moved longitudinally in either direction with equal facility.

The adjustable float plate generally indicated by numeral 12 is substantially L shaped in cross section and comprises the smoothing plate 18, a groove forming flange or lip 19, a vertical guide plate 20, and integral upwardly extending ears 21 and 22.

The smoothing plate 18 conforms substantially to the length of the base 14 and may be of any suitable width, the width illustrated in Figure 1 having been found satisfactory in practise. The two ends 23 and 24 of the smoothing plate are preferably upwardly rounded so that the smoothing plate may be readily moved over the rough plaster.

The groove forming flange or lip 19 is preferably rounded toward the inner side 25 of the lower portion of the guide plate 20, while the ends 26 and 27 of lip 19 are rounded at 28 and 29 similarly to the ends 23 and 24. The ends 26 and 27 are also tapered toward the ends of the device as at 30 and 31 (see Figure 4) to provide sharp scraping edges 62 and 63.

The guide plate 20 is substantially flat and is preferably constructed integrally with the lip 19 and the smoothing plate 18 and is preferably sufficiently high so that when the adjustable float plate element 12 is in the lowermost position thereof the upper edge 32 of the guide plate 20 is above the level of the lower surface of the sole plate or guide shoe 15. It is also desirable that when the adjustable float plate 12 is in the uppermost position thereof, that the edge 32 not encroach upon the D shaped orifice 33 in the handle element 11, so that it will not interfere with the free and easy movement of the fingers of the hand of the operator therethrough.

The ears 21 and 22 are each preferably rounded at the upper ends thereof and are each provided with vertically disposed slots 34 and 35 respectively. The length of the slots 34 and 35 determines the range of vertical adjustment which may be made to the float plate element 12.

The handle element 11 at the corners of the D shape is provided with transversely and horizontally disposed orifices, in which are mounted bolts 38 and 39 respectively. The bolts 38 and 39 have enlarged rounded heads 40 and 41, threaded end portions 42 and 43, and each bolt has a pair of parallel flat surfaces 44 and 45 (see Figure 3). The width of the slots 34 and 35 is such that sufficient clearance is provided to allow the vertical guide plate 20 to move vertically but the bolts 38 and 39 are prevented from rotating about their own axes. As a further means of preventing rotation of the bolts 38 and 39, if desired, the orifices 36 and 37 may be shaped to conform to the cross-sectional shape of the bolts 38 and 39.

It may thus be seen that by loosening the wing nuts 46 and 47, the float element may be quickly adjusted in position with relation to the handle element 11. The tightening of wing nuts 46 and 47 quickly and easily secures the adjustment. The cooperation of the slots 34 and 35 with the flattened portions 44 and 45 on the bolts 38 and 39 also tends to keep the smoothing plate 18 parallel with the sole plate 15.

Operation

After the rough or neat coat of plaster 50 has been previously put in place on the laths 51, and while the plaster 50 is still soft and plastic, the desired spacing of the outer surface 52 of the plaster 50 from the outer surface 53 of the door frame 54 is determined and the smoothing plate 18 is adjusted to the same distance from the sole plate or guide shoe 15 by manipulation of the wing nuts 46 and 47 as has been described hereinabove.

The sole plate 15 is placed in contact with the surface 53 and the surface 25 is placed in contact with the surface 55 (see Figure 6) of the frame 54, and then the device 10 is moved along with said contacts maintained. Depending upon the direction of travel, the sharp scraping edges 62 and 63 come into play and remove stray plaster which may have become lodged on the frame 54. This stray plaster is transferred to the curved lower surfaces 64 and 65 of the ends 23 and 24 which in conjunction with the lower surface of the smoothing plate 18 form this stray plaster into the main body of the coat of plaster 50. At the same time the flange or lip 19 forms a furrow or groove 66 of uniform and predetermined depth and configuration.

After the rough coat of plaster 50 has set, the finish coat of plaster 67 is put in place and as the same is smoothed to meet the surface 55, it forms a corresponding concealed projection or bead 68.

The groove 66 prevents any rough plaster from showing through and thus provides for a finer finish coat, it also forms a good anchorage for the bead 68. The bead 68 reinforces the plaster coat 67 at the edges thereof thus tending to prevent breaking and chipping along the margin.

It may thus be seen that I have provided a novel adjustable margin float, which possesses a high degree of handiness and utility. Adjustments of the tool in normal use are rapidly and easily made, and since the groove cutting lip and the smoothing plate are integral, the position of the former may be predetermined with relation to the latter so adjustment is simplified. This is of vital importance as it will be readily understood that when variations in other building parts are met, such as doors, windows, mouldings, etc., the tool must be very frequently adjusted so that the plaster coats may uniformly level.

I claim:

1. An adjustable margin float comprising a handle element having a substantially flat base adapted to act as a guide shoe and a float plate element including a vertical guide plate and a horizontally disposed smoothing plate, and means for adjustably attaching the vertical guide plate to said handle element.

2. An adjustable margin float comprising a handle element having a substantially flat base adapted to act as a guide shoe and a float plate element including a vertical guide plate, a horizontally disposed smoothing plate, and a groove forming flange or lip, and means adjustably attaching said vertical guide plate to said handle element.

NICHOLAS SASSANO.